UNITED STATES PATENT OFFICE.

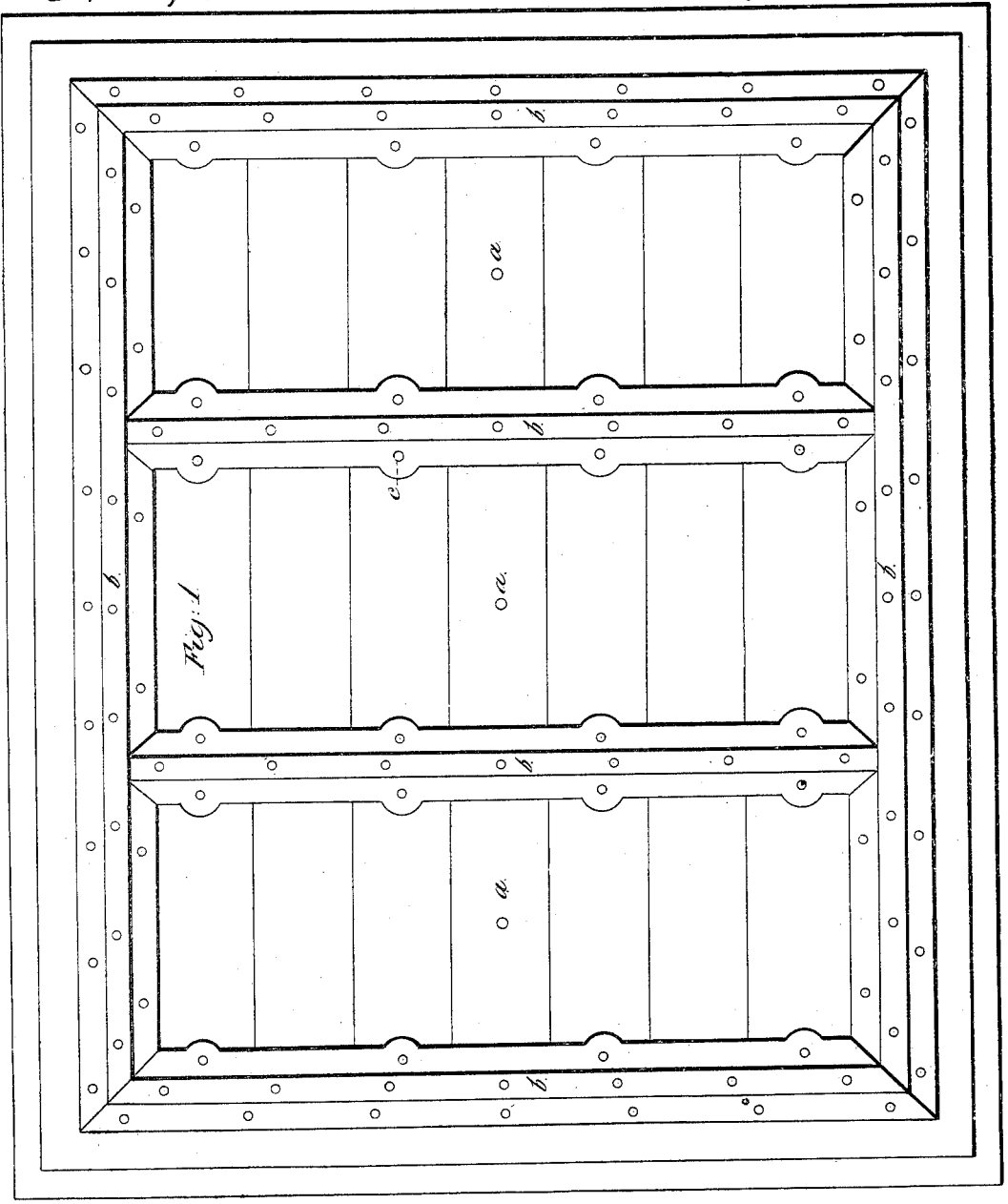

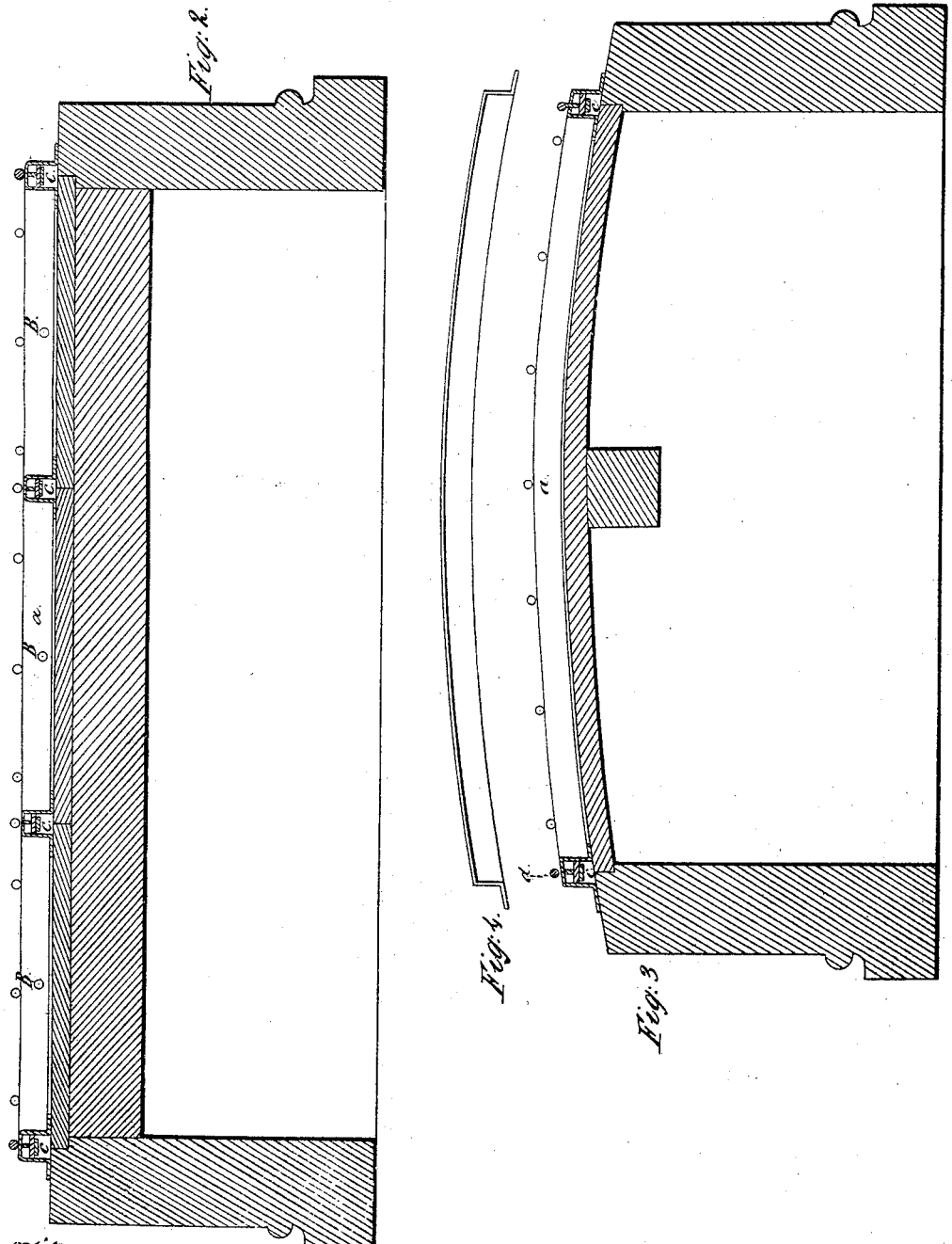

EDWARD S. KEYSER, OF NEW YORK, N. Y.

SECURING HATCHES OF VESSELS.

Specification of Letters Patent No. 18,816, dated December 8, 1857.

*To all whom it may concern:*

Be it known that I, EDWARD S. KEYSER, of the city and county of New York, State of New York, have invented a new and Improved Mode of Securing Hatches of Vessels; and I do hereby declare that the following is a full and exact description thereof, reference being had to accompanying drawings and to the letters of reference marked thereon.

The nature of my invention consists in covering the seams of vessels' hatches with an india rubber packing, which by means of iron (or other metallic) covers and screws, fitted for that purpose, can be compressed upon the seams tight enough to prevent the passage of any water through them, thereby obviating the necessity of calking and the use of tarpaulins, and also saving five-sixths of the time required to secure hatches by the mode now practiced in the merchant service, thereby making it safe to open hatches at sea for purposes of ventilation, or to get anything which may be required. Hatches will also be much safer when so secured.

To enable others skilled in the art to make and use my invention, I will proceed to describe its construction and operation.

I construct a set of hatches in the usual manner. I then bolt the fore and aft piece (or strongback) at each end with any common slide bolt; then secure each hatch to it by a screw ($a$, Fig. 1) passing through the middle carline of the hatch. I then apply to each seam of the hatches an iron (or other metallic) cover ($b$, Fig. 1) which has a flange on each side with screw holes in them. This I secure by screws (C, Fig. 1) to the hatches. (These screws fit into metallic cups set into the wood directly under the screw holes in the flanges). The cover is made sufficiently large to admit a square bar or strip of india rubber, as represented by Fig. 4. The india rubber is attached to a metallic bar which causes it to press down equally, and which slides freely inside the covers. The packing (E, Fig. 2) is compressed by the screws ($d$, Fig. 2). The fore and aft covers ($a$, Fig. 2) have three scuppers (B) which are continued through the packing by a metallic tube. These are intended to carry the water off the hatch which cannot run over the top.

(Fig. 3, $a$) represents one of the cross or end covers which have no scuppers. C and $d$ have the same reference here as in Fig. 2. The covers should have nipples around all the screw holes, and if required by any parties, a hinge can be put in the fore and aft covers, in order that one hatch may be taken off without covering up all the screws in the other two hatches.

Having thus fully described the nature and object of my invention, what I claim therein as new and desire to secure by Letters Patent is:

The securing of ships' hatches, and making the joints water-tight, by means of the hollow flanged ribs B, and the rubber, and plates contained within it, which are pressed down over the seams or joints by the screws $d$, substantially as herein set forth.

EDWARD S. KEYSER.

Witnesses:
WILLIAM E. CULVER,
WILLIAM H. MOTT.